UNITED STATES PATENT OFFICE.

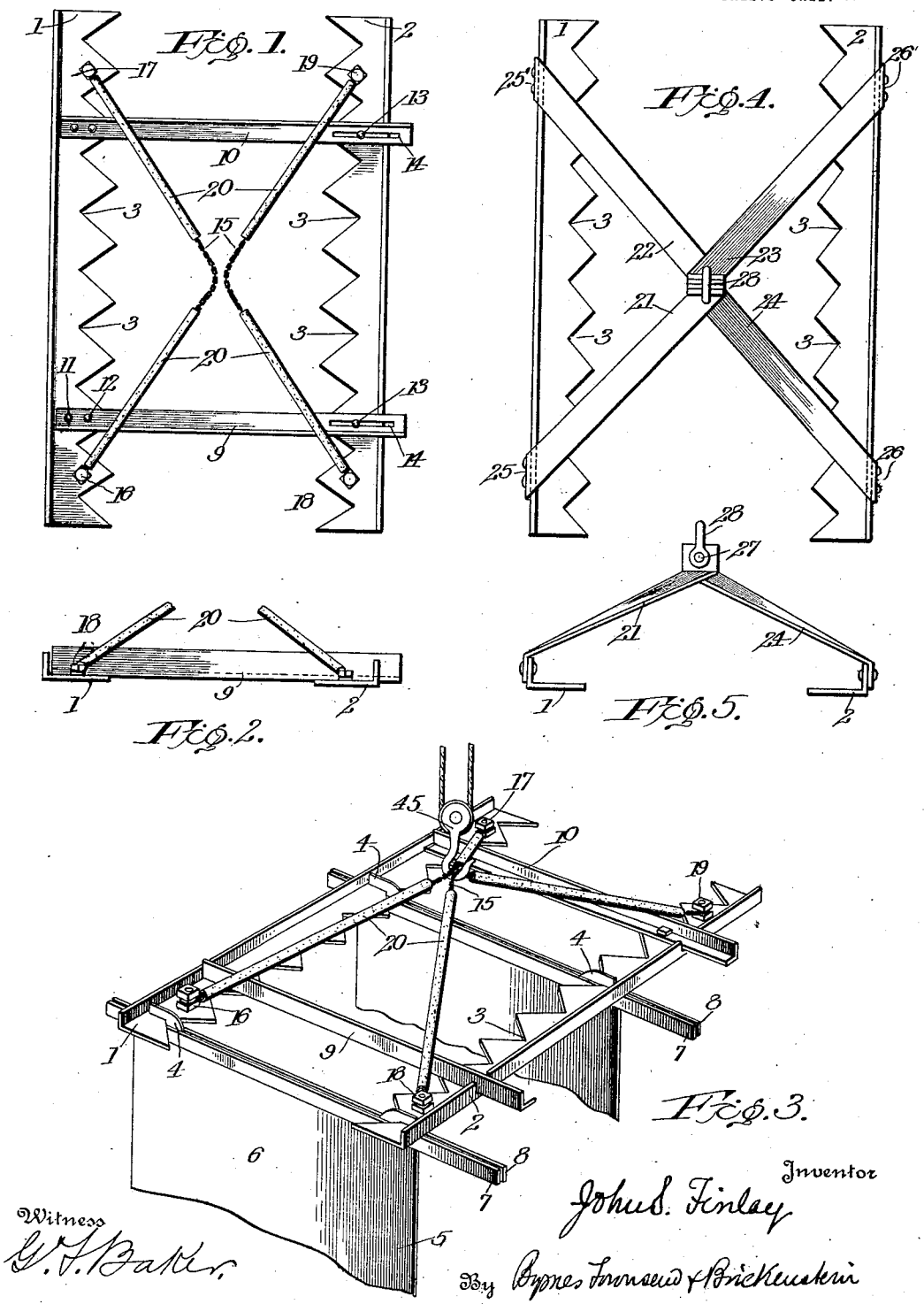

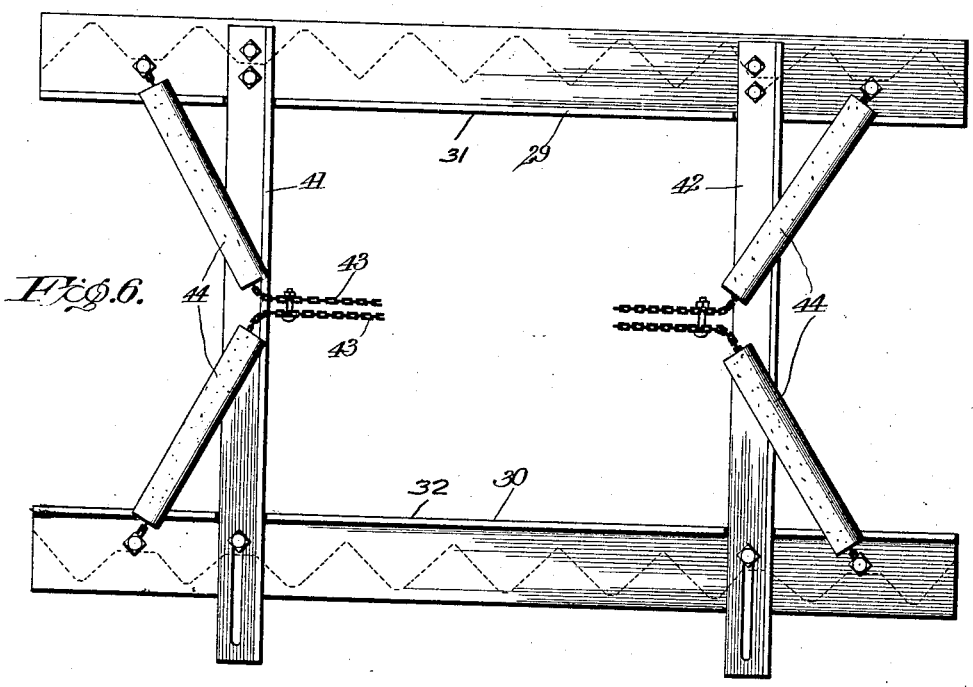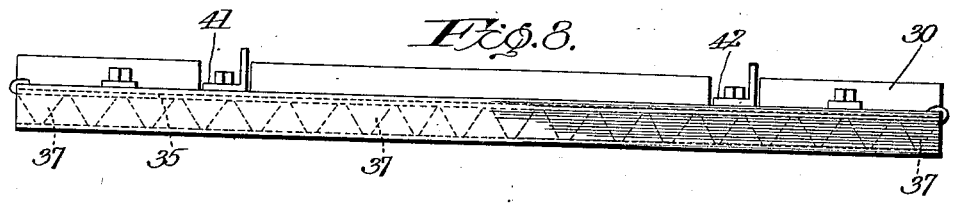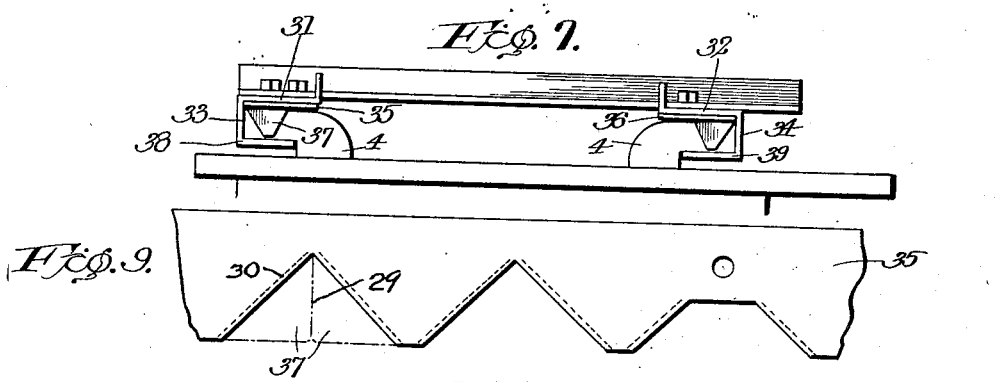

JOHN SPENSE FINLAY, OF GREAT FALLS, MONTANA, ASSIGNOR TO ANACONDA COPPER MINING COMPANY, OF ANACONDA, MONTANA, A CORPORATION OF MONTANA.

ELECTRODE-RACK.

1,311,958.   Specification of Letters Patent.   Patented Aug. 5, 1919.

Application filed January 9, 1918. Serial No. 211,065.

*To all whom it may concern:*

Be it known that I, JOHN SPENSE FINLAY, a citizen of the United States, residing at Great Falls, in the county of Cascade and State of Montana, have invented certain new and useful Improvements in Electrode-Racks, of which the following is a specification.

The present invention relates to racks suitable for use in metal-recovering plants.

Great difficulty has been experienced in securing means positive in its action for lifting from a cell at one time electrodes in multiple. It is the special object of this invention to provide a rack which will securely grasp electrodes in multiple and after they are lifted, keep them accurately spaced and at the same time be simple, light and easily operated.

For a better understanding of the invention, reference is made to the accompanying drawings, in which—

Figure 1 is a plan view of one form of rack;

Fig. 2 is an end view of the same;

Fig. 3 is an isometric projection of the same in combination with a number of electrodes just after being lifted from a cell;

Fig. 4 is a plan view of a modification of the form shown in Fig. 1, the chain and cross-pieces being dispensed with, diagonal bars operated from a central clevis and pin arrangement being used;

Fig. 5 is an end view of the same;

Fig. 6 is a plan view of another modification in which means are provided to prevent the rack from dropping down in contact with electrodes of opposite polarity, thereby causing a short circuit;

Fig. 7 is an end view of the same;

Fig. 8 is a side view of the same;

Fig. 9 is a plan view in detail of the pockets; and

Fig. 10 is a side view of the same.

The rack as shown in Figs. 1, 2 and 3 is composed of two side-pieces 1 and 2 of L-shaped section with notches 3 for engaging hooks 4, attached to electrodes 6 riveted between cross-bars 7 and 8, the lower portions of the hooks resting on the horizontal web of the side-pieces 1 and 2, two cross-pieces 9 and 10 for maintaining parallelism of the side-pieces when lifted of L-shaped section at each end of the rack, fixedly attached to the side-piece 1 by means of bolts 11 and 12 and slidably attached to side-piece 2 by means of the pins 13 working in the slide compartments 14; and suspending means such as chains 15 attached at 16, 17, 18 and 19 to side-pieces 1 and 2 and insulated by hose 20.

In the form of rack shown in Figs. 4 and 5 the cross-pieces are formed as diagonal suspending bars 21, 22, 23 and 24 and are fixedly attached to side-pieces 1 and 2 at 25, 25', 26 and 26' and pivotally attached to pin 27 working in clevis 28.

In the form of rack shown in Figs. 6, 7, 8, 9 and 10, the side-pieces are in the shape of channels formed by the horizontal webs 31, 38, and 32, 39 and vertical webs 33, 34 into which channels extend the electrode hooks 4. In this form of the device the spacing notches are vertically arranged instead of horizontally as in Figs. 1, 2, 3 and 4 and may be formed as shown in Figs. 8, 9 and 10 by cutting a flat plate along the lines 29 and bending down along the lines 30 to form the triangular portions 37, the plates 35 and 36 being secured on the under sides of webs 31 and 32. The upper surface of the hook bears on the under surface of the channel and prevents the supporting webs 38, 39 of the side-pieces from coming into contact with the anode bars and thereby causing a short-circuit.

The operation of the rack, which does not materially vary for any of the forms shown, will be described in connection with Figs. 1, 2 and 3. The frame is lowered until the side-pieces 1 and 2 are about touching the hooks 4 of the electrodes 6. The hooks 4 are then slipped into their respective notches 3 of the side-pieces 1 and 2 which are drawn toward each other until the hooks 4 are firmly and securely grasped, when the lifting device 45, attached to chains 15 lifts the electrodes from the cells, clamping them fast in the rack.

The forms of apparatus shown realize what heretofore has been difficult of accomplishment, namely, the production of a device which will securely grasp electrodes in multiple from cells and keep them accurately spaced and at the same time be simple, light and easily operated.

I claim:—

1. An electrode lifting rack comprising side-pieces having spaced notches adapted to receive electrode hooks and a horizontal member adapted to support said hooks, suspending means connected to said side-pieces, and means for maintaining said side-pieces in parallelism.

2. An electrode lifting rack comprising side-pieces having spaced notches adapted to receive electrode hooks and a horizontal member adapted to support said hooks, and suspending means connected to said side-pieces.

3. An electrode lifting rack comprising side-pieces having spaced notches adapted to receive electrode hooks and a horizontal member adapted to support said hooks, a second horizontal member adapted to rest upon the tops of said hooks, suspending means connected to said side-pieces, and means for maintaining said side-pieces in parallelism.

4. An electrode lifting rack comprising side-pieces having spaced notches adapted to receive electrode hooks and a horizontal member adapted to support said hooks, suspending means connected to said side-pieces and arranged to pull said side-pieces toward each other when the rack is lifted, and means for maintaining said side-pieces in parallelism.

5. An electrode lifting rack comprising side-pieces having spaced notches adapted to receive electrode hooks and a horizontal member adapted to support said hooks, a second horizontal member adapted to rest upon the top of said hooks, suspending means connected to said side-pieces and arranged to pull said side-pieces toward each other when the rack is lifted, and means for maintaining said side-pieces in parallelism.

6. An electrode lifting rack comprising side-pieces having spaced notches adapted to receive electrode hooks and a horizontal member adapted to support said hooks, suspending means connected to said side-pieces, and cross-pieces for maintaining said side-pieces in parallelism.

7. An electrode lifting rack comprising side-pieces having spaced notches adapted to receive electrode hooks and a horizontal member adapted to support said hooks, suspending means connected to said side-pieces, and cross-pieces fixedly attached to one side-piece and slidably to the other to maintain said side-pieces in parallelism.

8. An electrode lifting rack comprising side-pieces having spaced notches adapted to receive electrode hooks and a horizontal member adapted to support said hooks, a second horizontal member adapted to rest upon the top of said hooks, suspending means connected to said side-pieces and arranged to pull said side-pieces toward each other when the rack is lifted, and cross-pieces fixedly attached to one side-piece and slidably to the other to maintain said side-pieces in parallelism.

In testimony whereof, I affix my signature.

JOHN SPENSE FINLAY.

Copies of this patent may be obtained for five cents each, by addressing the "Commissioner of Patents, Washington, D. C."